UNITED STATES PATENT OFFICE.

ARTHUR NIXON, OF RUSHOLME, MANCHESTER, ENGLAND.

SOLID ELASTIC TIRE.

1,221,083. Specification of Letters Patent. Patented Apr. 3, 1917.

No Drawing. Application filed April 27, 1915. Serial No. 24,323.

*To all whom it may concern:*

Be it known that I, ARTHUR NIXON, a subject of the King of Great Britain and Ireland, residing at 34 Deramore street, Great Western street, Rusholme, Manchester, county of Lancaster, England, have invented new and useful Improvements in Solid Elastic Tires, of which the following is a specification.

This invention relates to solid elastic tires for vehicles and has for its object to provide a tire which will be more durable and cheaper than one composed wholly of rubber as at present.

According to this invention a solid elastic tire is composed of a composition consisting of rubber, lithopone, sulfur, litharge, and iron oxid in or about the following proportions, that is to say

| | |
|---|---|
| Rubber | 34 parts. |
| Lithopone | 50 parts. |
| Sulfur | 6 parts. |
| Litharge | 2 parts. |
| Iron oxid | 2 parts. |

Although any suitable kind of rubber may be used, I have ascertained by experiment that Peruvian hard ball rubber gives the best results.

The improved solid elastic tire is manufactured as follows:—

The rubber is repeatedly passed between heated rolls and during its passage is sprinkled with the lithopone, sulfur, litharge and iron oxid which have previously been thoroughly mixed together. The rubber is occasionally folded or doubled with the sprinkled mixed ingredients inside the fold in order to insure a thorough and regular mixing of the said ingredients and the rubber. The rolling, sprinkling and folding is continued until the rubber has taken up the whole of the other mixed ingredients. The dough or composition thus obtained is molded or shaped by means of a tire mold or otherwise, into a tire which is afterward vulcanized in the usual way.

What I claim as my invention and desire to secure by Letters Patent is:—.

A solid elastic tire composed of a composition consisting of rubber, lithopone, sulfur, litharge and iron oxid in or about the proportions of rubber, 34 parts; lithopone, 50 parts; sulfur, 6 parts; litharge, 2 parts; and iron oxid, 2 parts.

In testimony whereof I have signed my name to this specification in the presence of two subscribing witnesses.

ARTHUR NIXON.

Witnesses:
EDMUND WARD PATTISON,
HAROLD WALKER.